United States Patent [19]

Segal et al.

[11] 4,360,910

[45] Nov. 23, 1982

[54] DIGITAL VOICE CONFERENCING APPARATUS IN TIME DIVISION MULTIPLEX SYSTEMS

[75] Inventors: Joshua L. Segal, Chelmsford; Charles F. Sargent, Boston, both of Mass.

[73] Assignee: The United States of America as represented by the Secretary of the Air Force, Washington, D.C.

[21] Appl. No.: 171,916

[22] Filed: Jul. 23, 1980

[51] Int. Cl.³ .......................... H04J 3/02; H04M 3/56
[52] U.S. Cl. ...................................... 370/62; 370/85; 179/1CN
[58] Field of Search ....................... 370/62, 85, 92, 94; 179/1 CN, 18 BC

[56] References Cited

U.S. PATENT DOCUMENTS

| | | | |
|---|---|---|---|
| 3,846,587 | 11/1974 | Schenkel et al. | 370/85 |
| 3,851,104 | 11/1974 | Willard et al. | 370/85 |
| 3,940,564 | 2/1976 | Orbach | 370/62 |
| 4,048,449 | 9/1977 | Natebusch | 179/18 BC |
| 4,139,731 | 2/1979 | Hashemi et al. | 179/1 CN |
| 4,301,531 | 11/1981 | Lubin | 370/62 |

Primary Examiner—Douglas W. Olms
Attorney, Agent, or Firm—Donald J. Singer; William Stephanishen

[57] ABSTRACT

A digital voice conferencing apparatus utilizing a time division multiplex system to process data packets from and to the participants of the conference call. The subscribers and the conference call originator utilize a time division multiplex (TDM) adapter to establish a conference call mode, to identify the members thereto, and to provide all the means for transmitting and receiving the voice packets to the conference members excepting each members own voice packet. A digital voice conferencing apparatus is located at each subscriber location and permits all subscribers who may be talking simultaneously to be understood.

3 Claims, 2 Drawing Figures

DIGITAL VOICE CONFERENCING APPARATUS IN TIME DIVISION MULTIPLEX SYSTEMS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to conference circuits for use in a telecommunications system, and in particular to a digital voice conferencing apparatus in a time division multiplex system.

In a telecommunications system, the operation of connecting more than two parties together in a single call is known as conferencing, and a circuit for performing such an operation within an exchange or other switching center is referred to herein as a conference circuit. The function of such a conference circuit therefore is to feed to each conferring party the sum of the speech signals from all the other conferencing parties, but not his own speech signal since this would give rise to undesirable side tone effects.

The analog conference bridge is used for adding the audio signals on the multiple telephone circuits. The conference bridge may be implemented by any of several well-known techniques for bringing together and summing audio signals. The conference bridge is used to maintain the audio signal level for multiple circuits as opposed to direct summing at each telephone as in an extension telephone connection. The extension telephone principle alters the impedance level as each telephone is connected and thus impairs voice signal strength.

In the conventional method of conferencing analog telephone systems, each user sends electrical signals either digital or analog to the central conference bridge. The conference bridge sums the inputs from each conference and returns a signal to each conferee. The signal returned to each conferee includes all conference users minus that particular users input. For example, in a three party conference, user A hears the sum of B+C, not A+B+C. This is because a telephone talker hears himself via a side tone. If he also heard his signal as part of the conference, an objectionable echo could result. In a conventional conference, a conference bridge is required for each conference and the bridge must have the capacity to support all the users who would like to participate in the conference. Furthermore, only the conference bridge had access to all individual signals in the conference and each user's line connecting him to the conference could only support a single signal.

In a system wherein the conventional conferencing method is adapted to a TDM architecture, the actual implementation of this type of conferencing, takes no advantage of the fact that in TDM systems all users have access to all the signal packets. Each user sends data to a central conference bridge which sums the input from each conferee and returns a signal to each conferee. If the data rate of the digitized voice is R, then the bandwidth necessary to support an n party conference is 2nR.

SUMMARY OF THE INVENTION

The present invention utilizes a time division multiplex adapter unit at each telephone user location to provide the means to translate analog phone signals to and from a digital format. Analog audio signals from a calling telephone are converted to digital format for transmission in the time division multiplex system. An address prefix to the digital format is used by the receiving telephone adapter to select the caller information from the TDM systems. Conferencing capability is provided through the use of a conference prefix which establishes a conference mode within which any number of conferees may be included. In the conference mode, each conferee receives the digitized voice packet of all the other conferees except its own voice packet and conference protocol limits the number of users actually talking at the same time.

It is one object of the present invention, therefore, to provide an improved digital voice conferencing apparatus.

It is another object of the invention to provide an improved digital voice conferencing apparatus wherein the signals from each user are available to all other users.

It is still another object of the invention to provide an improved digital voice conferencing apparatus wherein conference protocols limit the number of users actually talking.

It is yet another object of the invention to provide an improved digital voice conferencing apparatus wherein voice operated transmitter algorithms identify which users are talking at any given instant.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
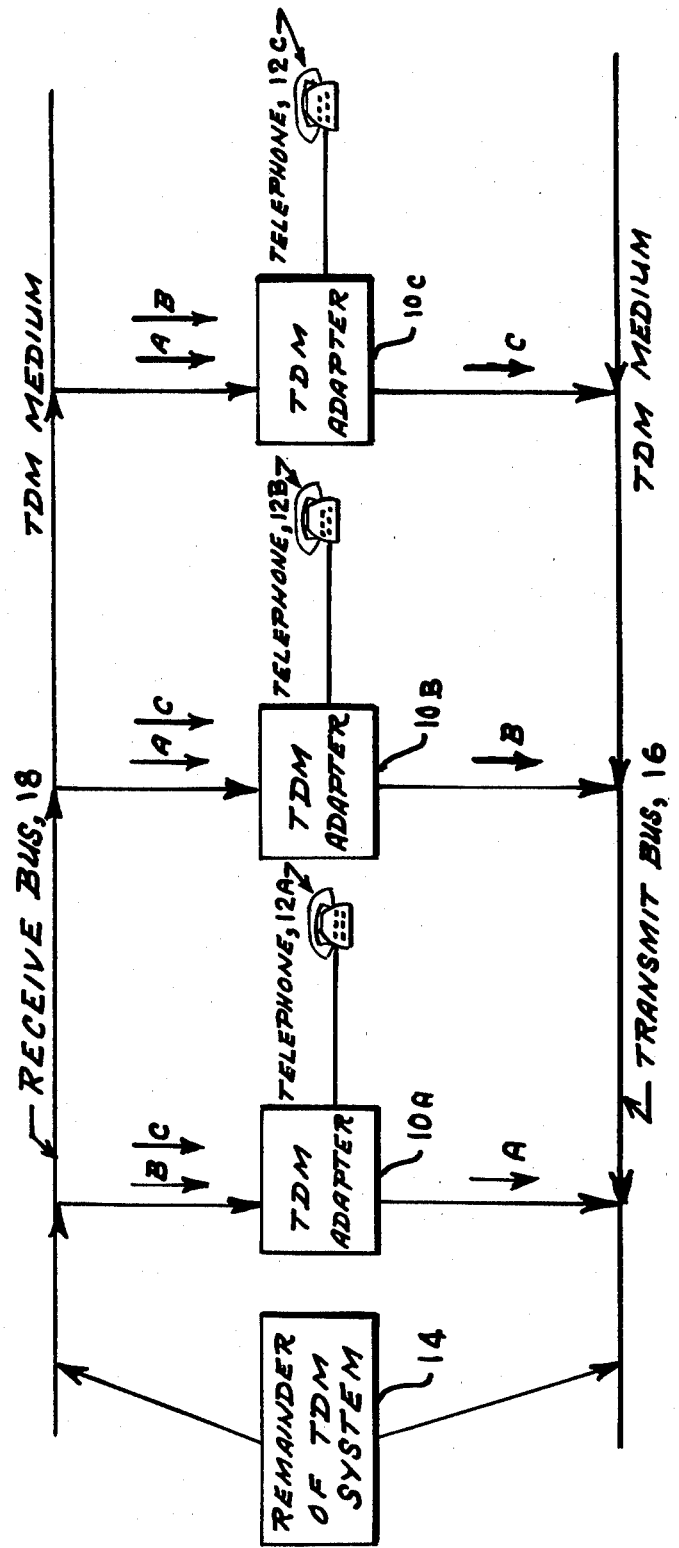
FIG. 1 is a block diagram of a distributed time division multiplex conference circuit in accordance with the present invention.

Referring now to FIG. 1, there is shown a distributed time division multiplex (TDM) telephone system using TDM adapter units at each telephone location. In the present example, there are only three telephone user locations, A, B and C shown in the system. However, it should be understood that any number of subscribers may be connected. Thus, it may be seen that at each location A, B and C, there is a TDM adapter $10n$ wherein n represents the letter designation of the particular location. The TDM adapter 10A, as are all the adapters, is connected to the transmit and receive bus 16, 18 both of which are unidirectional in information flow to and from the remainder of the TDM system 14.

To achieve a conference capability in the system each TDM adapter contains the capability to sum received signals. Each user in the conference would transmit data packets with the conference address prefix and each conferee would receive and process those packets with the conference address prefix. As indicated in FIG. 1, each TDM adapter would not process the packets transmitted by that user with the conference address prefix. Similarly, once the conference is established each user will not process packets in the system with other address prefixes. The bandwidth necessary to support an n party distributed conference may be seen to be nR rather than 2nR as is the case in a conference bridge system. Also it may be seen that different conference address prefixes may be established for separate conferences and any number of conferences may be in progress simultaneously. Thus with the distributed conference technique, the number of conferences is no longer limited to the number of available conference bridges since each subscriber has his own summing capability.

A typical conference call would be accomplished in the following manner. Assume that user A is the conference call originator. A picks up the telephone and the TDM adapter recognizes an off-hook signal and generates a dial tone for telephone A. A dials a conference prefix which is received in the TDM adapter 10A and A's dial tone is removed. Then A dials the required number of digits or numbers to indicate to the TDM adapter 10A that a link to B is requested. The TDM adapter 10A then forms a service packet for transmission to B via the TDM system. The service packet contains A's address, as call originator; B's address as the recipient of the packet; an address, as call originator; B's address as the recipient of the packet; an indicator that the service packet is a link request; and an indicator that the request is for a conference. When the link request is transmitted it will be received by B's TDM adapter 10B and processed based on being addressed to B. B's TDM adapter will respond with either a busy or a not busy via a similar service packet addressed and transmitted to A. If B responds not busy, the B's TDM adapter 10B rings B's phone and the returned not busy or link accept causes A's TDM adapter 10A to generate a ring back signal. Thus, A is aware that B's telephone is ringing. The phone at B is ringing. When B picks up the phone to answer the call, B's TDM adapter recognizes the off-hook signal and forms a voice enable service packet for transmission to A. At the same time, B's TDM adapter 10B accepts audio from B't telephone, digitizes the audio and forms digitized audio voice packets for transmission to A. When A receives the voice enable service packet, the TDM adapter 10A similarly accepts audio from telephone 10A, digitizes the audio and forms digitized audio voice packets for transmission to B. Because it is a conference call, rather than a point to point call which would be similarly arranged, a digitized voice packets contain the same destination address, in this case the address of A. A's transmitted packets are addressed to A and B's TDM dapter recognizes and accepts digitized voice packets addressed to A rather than B. B's transmitted packets are addressed to A and received by A. Since each packet also contains the originators address, the TDM adapters are able to distinguish whether or not they transmitted the packet they have received. Thus, A's packets are received by B's TDM adapter 10B, the digitized signal is converted to audio and sent to B's telephone 12B. B's packets are received by A's TDM adapter 10A, the digitized signal is converted to audio and sent to A's telephone 12A. User A and user B are therefore able to talk to each other. Rather than use A as the conference address it would also have been possible to assign a separate unique address for the conference and each TDM adapter to process digitized audio packets with that unique address. This feature permits the conference originator to hang up on an established conference and be available for other calls. Alternatively a conference address may be established permanently such that each conferee merely dials into the established conference on instruction or at a particular time. This feature avoids having to call each person in the conference separately.

In order to involve another user C in the conference call A, the conference originator, will dial in C's address or number and because it is a conference, the TDM adapter will set up another user, C. Even though digitized audio packets are being passed from A to B, the TDM adapters can also pass service messages to one another. If a busy dial tone is received from C, another number may be called if desired to get some other person into the conference. The conference prefix is required to be entered into the system only once. Thus, after getting B into the conference, all that is needed is to dial up the additional people that are wanted in the conference until the number of people you want to talk respond and are included. All will be transmitting to the same address so they are able to receive digitized packets from the same address. The conference prefix which is dialed in when A initiates the conference call is included in the message from A to the others inviting them to join the conference. The conference prefix is also entered in the TDM adapter of each conferee.

Time division multiplex is a method for transmitting information from multiple sources to multiple receivers on a common medium. TDM systems are characterized by each source having a period of time in which it, and only it, is transmitting information via the medium. The ability of each receiving device to receive any part, or all, of the information in the systems is a fundamental characteristic of the system. Propagation of the signal thru the medium may be unidirectional or bidirectional. FIG. 1 illustrates a unidirectional system, in which case, the TDM system, in its simplest form would merely connect the transmit side directly to the receive side. The transmission of information may, or may not, be in equal increments of time. Unique periods for transmission may be assigned to an originating source or the source may request a period in which to transmit.

Figure 2:
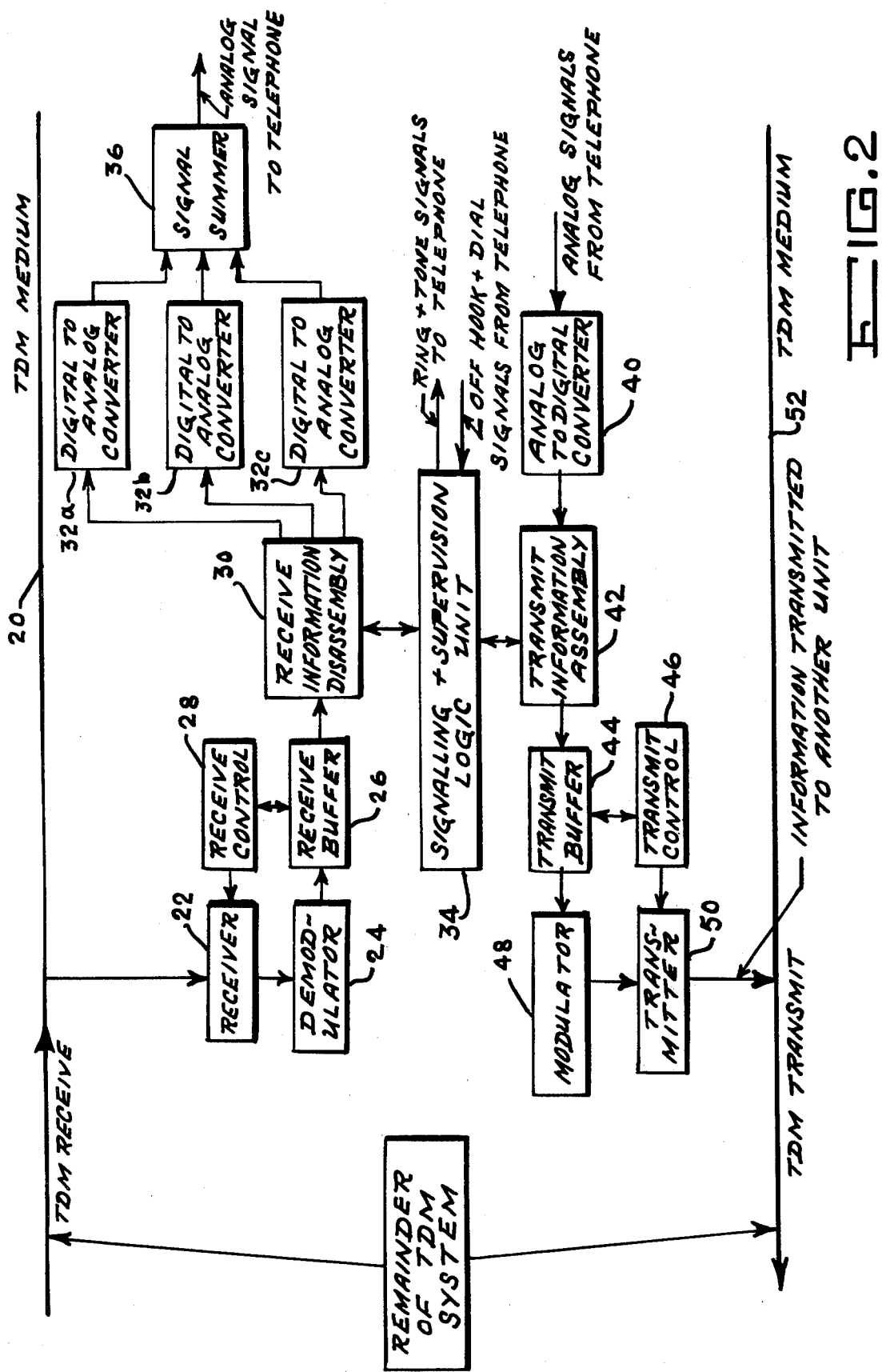
FIG. 2 is a block diagram of the time division multiplex adapter apparatus.

Turning now to FIG. 2, there is shown a block diagram of the TDM adapter which is utilized for the transmission of digital voice packets The TDM adapter comprises two circuits the transmit and the receive circuit. The receive circuit is connected between the receive bus 20 and the telephone (not shown). The digitized packets, which may include digitized voice signals and or service messages, are received from the receive bus 20 by receiver 22. The output from the receiver 22 is applied to the demodulator 24 for demodulation and then to the receive buffer 26 for storage until time for message processing. The receive control unit 28 provides control signals to both the receiver 22 and the receive buffer 26. Upon receipt of a control signal from the receiver control unit 28, the information in the receive buffer unit 26 is applied to the receive information disassembly unit 30 wherein the address and service information is separated from the digitized audio. The address and service information is sent to the signalling and supervision logic unit 34 wherein call set up and signalling and supervision messages are processed. The digital to analog converter unit 32 converts the digitized audio from the receive information disassembly unit 30 to analog audio signals which are applied to the telephone receiver. While the embodiment described herein provides for three separate conferee's receive signals to be converted to audio and summed for presentation to the telephone receiver for conferencing, it will be understood that providing an n party summing capability for each user may be included in the digital to analog converter unit 32.

Depending upon the application, a three party summing capability may be achieved through the utilization of three digital to analog converter units in parallel as shown in FIG. 2. Each is connected to the receive information disassemhly unit 30 to receive the digitized audio therefrom. The digitized audio from each of the three simultaneous speakers would be respectively applied to a separate D/A converter unit for conversion to an analog signal which would then be summed in an analog summer unit and applied to the user's telephone. An alternative method of implementation would be the summation of the digital signals from the three simultaneous speaker prior to application to the D/A converter unit. Although it is possible to build an n party summing device for each user as described above because of conference protocol not all n parties will talk at once and, therefore, a less than n summing capability may be adequate.

In an n party conference, most of the time there is one talker and n−1 listeners. Occasionally the talker is interrupted by one or more of the listeners. As the number of simultaneous interrupters increase, however, the intelligibility of the conference quickly drops to zero. Therefore, the summing capability is reduced for each user to a number less than n, provided that at any instant, the speakers can be identified from number of the n users. The n party conference will still include n listeners, but the simultaneous talker summation capability will be limited to some lesser number. A three talker summation capability should suffice in most conferences. In order to implement the limited summing conference it is necessary to distinguish the parties talking at any instant of time from the parties not talking. A convenient way to do this is by VOXing (Voice Operated Transmits) which transmits only the signals of talkers. VOXing can be implemented in many ways both analog and digital with the effect of assuring that when a member of the conference is not talking he is not transmitting. Bandwidth necessary to support a VOXed n party distributed conference with limited summing is less than or equal to 3R.

Referring again to FIG. 2, there is shown the analog signal from the telephone being applied to the analog to digital converter unit 40 for conversion from analog to digital bits. The digitized audio signal is applied to the transmit information assembly unit 42 wherein the addresses, such as the conference address, user's address and other data identification required for transmission is received from the supervision and logic unit 34 and affixed to the data packets. The data packets are applied to the transmit buffer unit 44 wherein the packets are stored until the transmit control unit 46 sends a transmit control signal to the buffer unit 44. When the control signal is received by the transmit buffer unit 44, the data packets are applied to modulator unit 48 and then to the transmitter unit 50 which receives an enable signal from the transmit control unit 46. The transmitter unit 50 in response to the enable signal transmits the digitized messages on the transmit bus 52.

Although the invention has been described with reference to a particular embodiment, it will be understood to those skilled in the art that the invention is capable of a variety of alternative embodiments within the spirit and scope of the appended claims.

What is claimed is:

1. In a time division multiplex system having a unidirectional receive and transmit bus the improvement comprising:

a plurality of distributed communication interfacing units, each of said plurality of distributed communication interfacing units connected between said receive and transmit bus to said time division multiplex system, each communication interfacing unit comprising in combination:

a telephone means converting audio signals to an analog signal for transmission therefrom, said telephone means receiving analog signals for reconversion into audio signals, means for adapting said time division multiplex system, said adapting means connected between said receive and transmit bus, said adapter means connected to said telephone means to receive analog signals therefrom and to transmit analog signals thereto, said adapter means converting said analog signals from said telephone means to digital message packets, said adapter means transmitting said digital message packets on said transmit bus to said time division multiplex system, said adapter means receiving digital message packets from said time division multiplex system by means of said receive bus, said adapter means converting said digital message packet to an analog signal and applying said analog signal to said telephone means, and, a summing means connected between said telephone means and said adapter means, said summing means only summing the signals passing from said adapter means to said telephone means.

2. A time division multiplex system as described in claim 1 wherein a conference call is initiated by one member of the time division multiplex system, a conference prefix is entered into the time division multiplex system by an originating person through the use of said telephone means, said conference prefix being stored in the originator's adapter means, said conference prefix being transmitted by the originator to each conferee's adapter means for storage therein, each conference member transmitting and receiving only digital message packet containing said conference prefix.

3. A time division multiplex system as described in claim 1 wherein said summing means is an analog summing means.

* * * * *